Patented Aug. 4, 1942

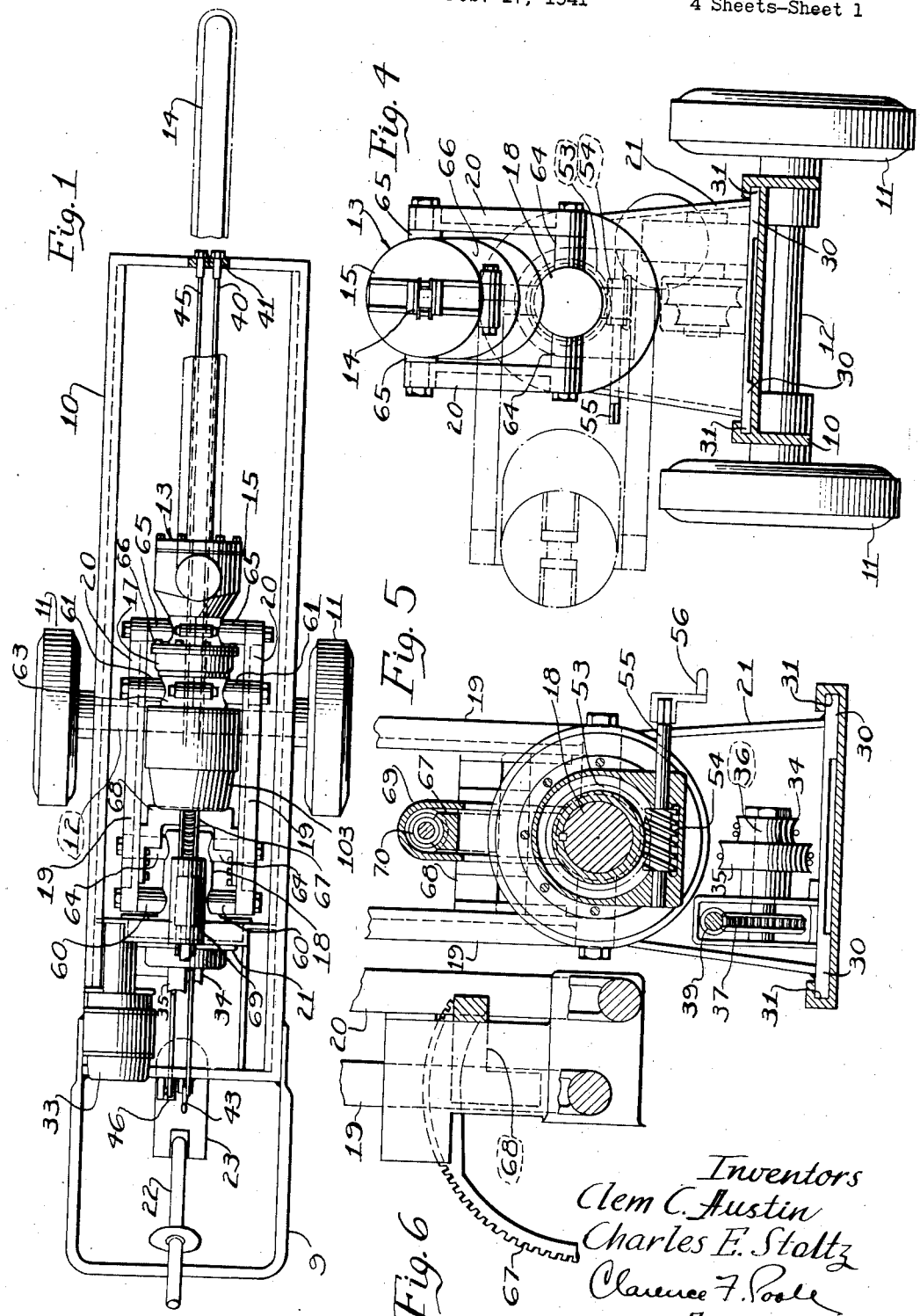

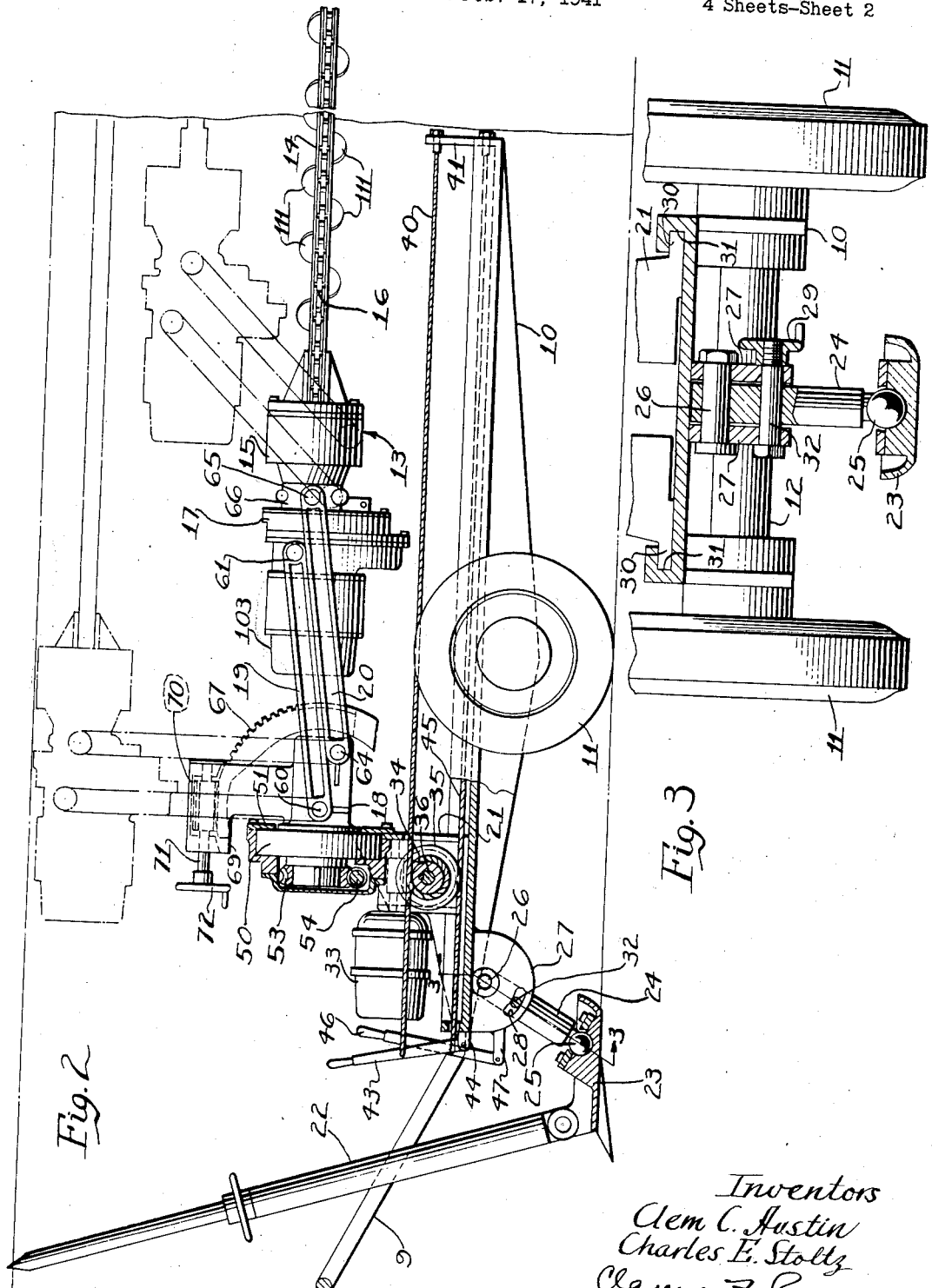

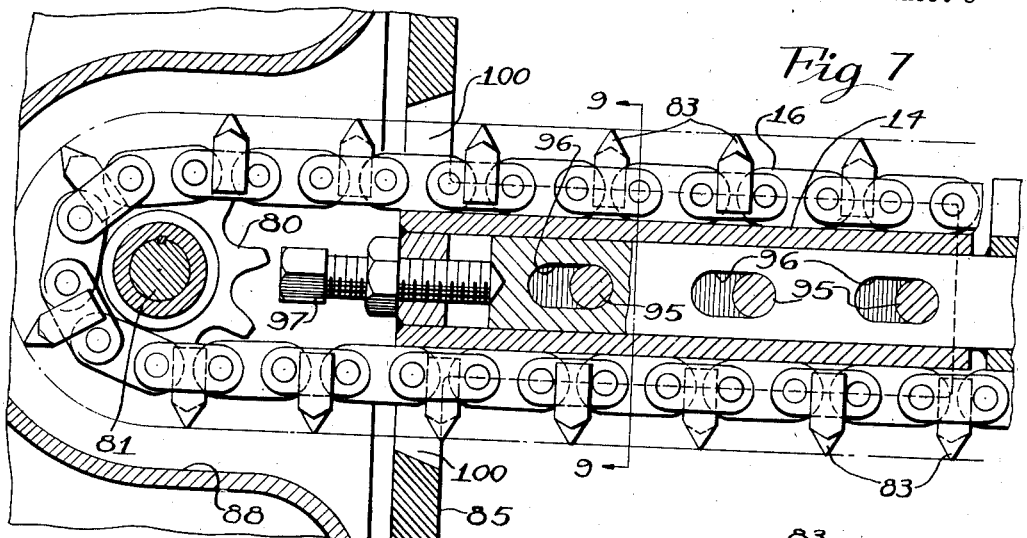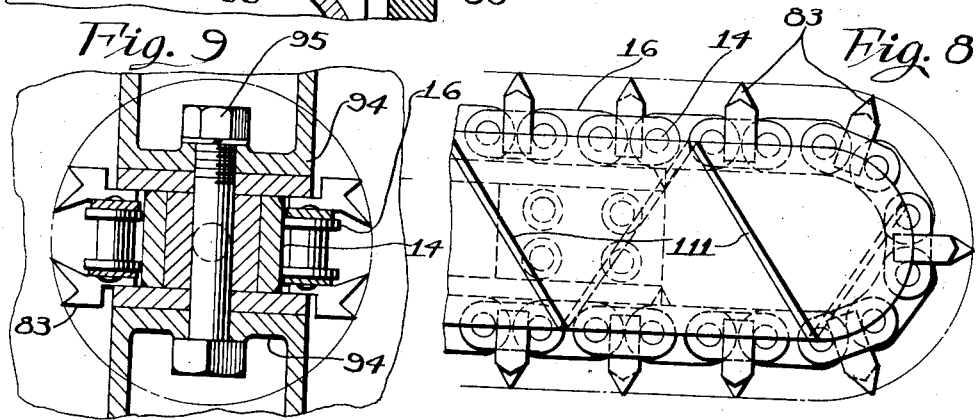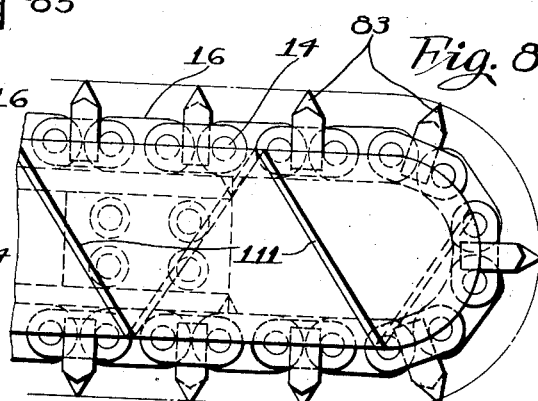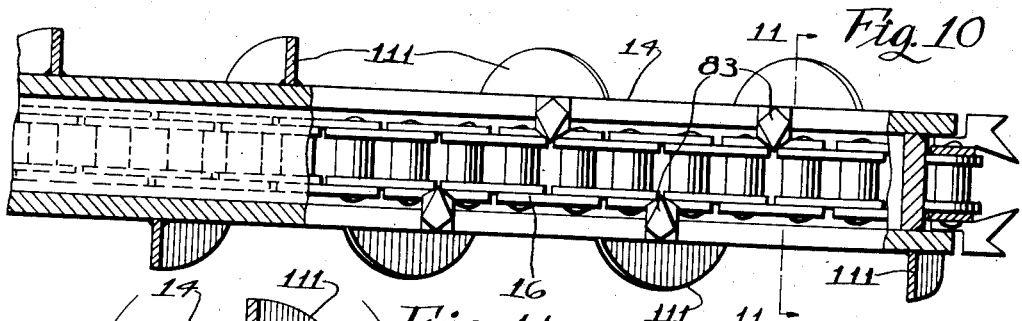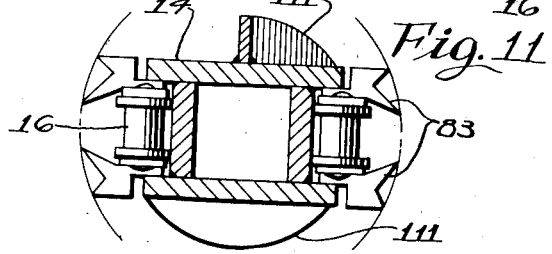

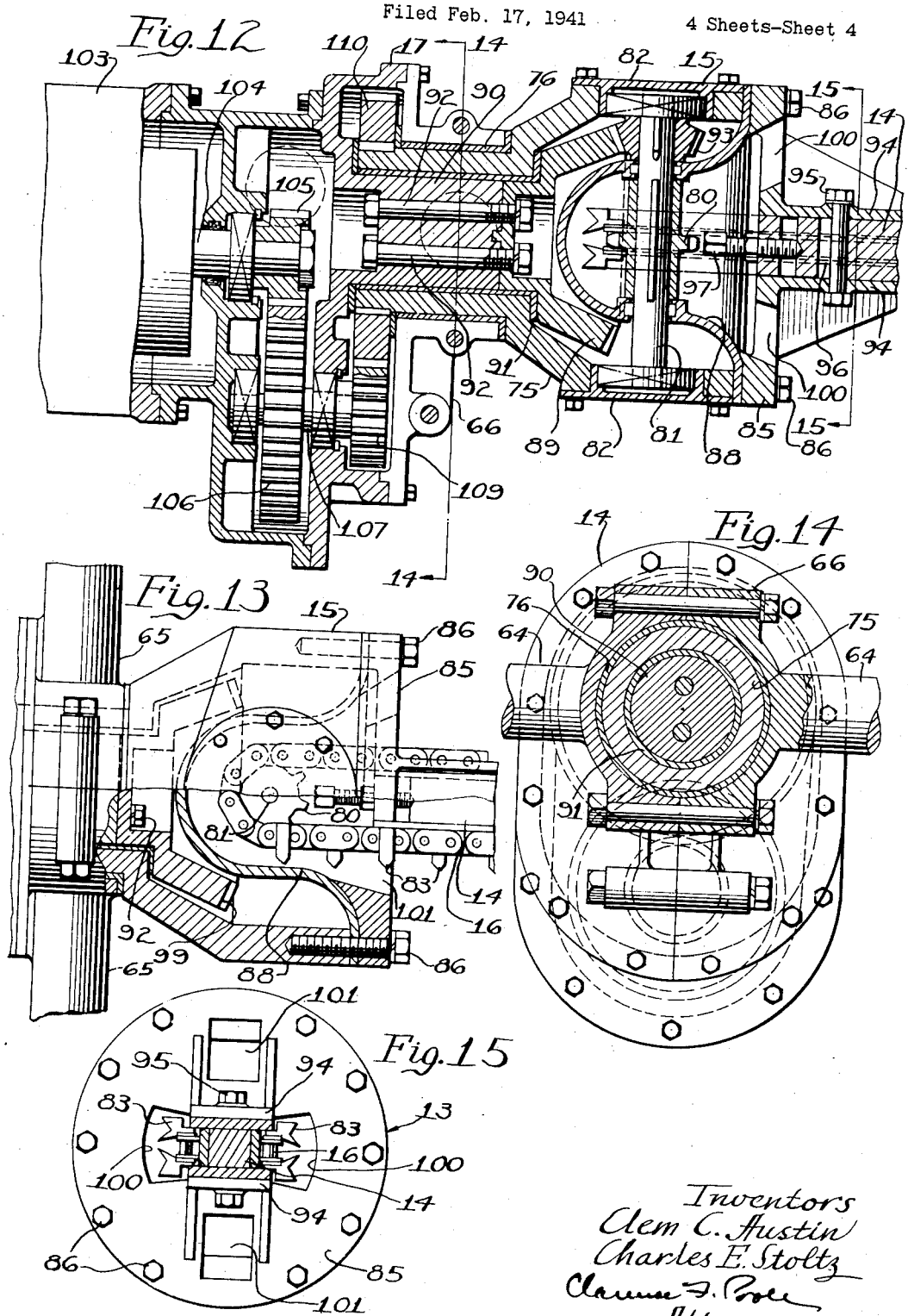

2,292,098

UNITED STATES PATENT OFFICE 2,292,098

CUTTING OR DRILLING DEVICE

Clem C. Austin, Riverside, and Charles E. Stoltz, Chicago, Ill., assignors to Goodman Manufacturing Company, Chicago, Ill., a corporation of Illinois Application February 17, 1941, Serial No. 379,218

18 Claims. (Cl. 262—28)

This invention relates to improvements in cutting or drilling devices and more particularly relates to a new and improved drilling device adapted to drill relatively large holes in mines.

Expansible cartridges, expanded by fluid pressure, have come into quite common use for breaking down undercut material, such as coal, in mines, especially where the mining laws prevent shooting during the working shift. When using such a cartridge, a number of holes of approximately six inches in diameter and six feet or more in depth must be drilled in each working face, to accommodate the cartridge. It is desirable that these holes be drilled closely adjacent the mine roof and that the drill be of such a size that it can readily be handled by one man. With the present forms of drills, which are small enough so they can be handled by one man, it takes at least twenty minutes to drill each hole the required depth. This drilling time makes the cost of using these cartridges unnecessarily high, and at the present time no suitable drill has been found which can appreciably speed up the drilling operation for these large cartridges.

Moreover, this condition cannot be readily remedied by the provision of a larger and more powerful drill since mining drill bits have heretofore been so constructed that the same cutting edges are continuously in engagement with the material which is being drilled, during the entire drilling operation, and the drilling speed of the drill is limited by the amount of heat the bits will stand. Thus, larger drill motors and feeding speeds and higher rotational speeds for the drill will not materially increase the speed of the drilling operation.

In carrying out our invention, we remedy these difficulties by providing a device which will drill round holes at speeds far higher than has formerly been possible, by successively presenting a multiplicity of cutting surfaces or bits to the inner end of the hole, each of which cutting surfaces after having made its cut, travels along and outside of the hole and again travels into the hole to again make a cut, thus cutting down the actual cutting time of each cutting surface and giving each cutting surface an opportunity to cool after it has made a cut and before making its next cut.

The principal objects of our invention are to provide a new and improved form of rotatable drill, presenting a number of traveling cutting surfaces to the coal face.

A more specific object of our invention is to provide a new and improved form of rotatable coal drill including a longitudinally extending cutter bar rotatably driven about a longitudinal axis and having a cutter bit carrying chain orbitally driven thereabout during rotation of said bar.

A still further object of our invention is to provide a new and improved form of drill, so arranged as to be readily transported about the mine and including a novel and simplified form of truck forming an adjustable support for the drill and forming a base along which the drilling mechanism may be fed into the working face.

Other objects of our invention will appear from time to time as the following specification proceeds and with reference to the accompanying drawings wherein:

Figure 1 is a plan view of a drilling device constructed in accordance with our invention, with certain parts broken away and with certain other parts shown in horizontal section;

Figure 2 is a view in side elevation of the device shown in Figure 1, with certain parts broken away and certain other parts shown in longitudinal section;

Figure 3 is an enlarged fragmentary sectional view taken substantially along line 3—3 of Figure 2;

Figure 4 is a front end view of the device shown in Figure 1, with certain parts shown in transverse section;

Figure 5 is a fragmentary transverse sectional view of the device shown in Figure 1, showing certain details of the means for feeding the drill into the coal face and for adjusting it laterally and vertically;

Figure 6 is an enlarged detail view showing certain details of the adjusting mechanism for the drill;

Figure 7 is an enlarged fragmentary detail plan view of the forward portion of the drilling mechanism, showing certain details of the cutter bar and cutter chain;

Figure 8 is an enlarged detail view showing certain details of the front end of the cutter bar;

Figure 9 is a transverse sectional view taken substantially along line 9—9 of Figure 7;

Figure 10 is a view in side elevation of the cutter bar, with certain parts broken away and certain other parts shown in longitudinal section;

Figure 11 is a transverse sectional view taken substantially along line 11—11 of Figure 10;

Figure 12 is an enlarged fragmentary longitudinal sectional view of the drilling head;

Figure 13 is an enlarged fragmentary plan view of a portion of the drilling head, illustrating certain details thereof, not shown in Figure 12;

Figure 14 is a sectional view taken substantially along line 14—14 of Figure 12; and Figure 15 is a fragmentary sectional view taken substantially along line 15—15 of Figure 12.

Referring now in particular to Figures 1 and 2 of the drawings, the embodiment of our invention illustrated includes a portable base frame 10 mounted on a pair of wheels 11, 11 on opposite ends of an axle 12, disposed intermediate the ends of said base frame. Said base frame mounted on said wheels and axle forms a portable support for a drilling mechanism generally indicated by reference character 13. Said wheels are herein shown as being rubber tired, and the tires of said wheels are preferably hard, to prevent deflection of the drill during the drilling operation. A handle 9 projects rearwardly from said base frame, to permit movement of the drilling mechanism about the mine by hand.

The drilling mechanism 13 includes generally a cutter bar 14 projecting from a rotatably driven cutter head 15 and having a cutter chain 16 guided for orbital movement thereabout, during rotation of said cutter head. Said cutter head is rotatably mounted in a housing and supporting framework 17, which is adjustably mounted on a neck 18, by means of two pairs of parallel links 19 and 20. Said neck is rotatably adjustable about an axis extending longitudinally of said base frame, and is mounted on a support frame 21, which is slidably moved along said base frame by power, for feeding said cutter bar endwise into a coal face (see Figure 2).

The base frame 10, as herein shown, is adapted to be held in position during the drilling operation by means of a jack 22, transversely pivoted to a shoe 23 at its lower end and adapted to be engaged with the mine roof at its opposite end, in a usual manner. Said shoe is connected with the rear end of said base frame by means of a leg 24, herein shown as having a ball 25 formed on its lower end, adapted to engage a suitable socket formed in said shoe. The opposite end of said leg has pivotal connection with said base frame by means of a pivotal pin 26, mounted adjacent its opposite ends in a pair of spaced apart sectors 27, 27 depending from the rear end of said base frame. Said sectors are provided with aligned arcuate slots 28, 28, through which extends a bolt 32, having a hand wheel 29 threaded on the outer end thereof. Said bolt extends through the leg 24, intermediate its ends, and said bolt and hand wheel form a clamping device for holding said base frame in varying angular positions with respect to the ground, and to permit the angle of the drilling apparatus 13 with respect to the ground to be adjusted for drilling at varying angular relationships with respect to the ground.

The frame 21, which forms a support for the drilling apparatus 13, as has hereinbefore been mentioned, is provided with a pair of laterally projecting feet 30, 30, which rest on the bottom of the base frame 10 and which are guided for movement longitudinally therealong in inwardly opening gibbed guides 31, 31 (see Figure 5). Said frame, besides forming a support for said drilling mechanism, also forms a means for feeding said drilling mechanism into or withdrawing it from the face of the material which is being drilled, and has a motor 33 mounted thereon, which forms a means for driving a pair of coaxial drums 34 and 35. Said drums are mounted on a transverse shaft 36, journaled in the frame 21, and form a feeding means for said drilling apparatus along said base frame (see Figures 2 and 5). The drum 35 is of a larger diameter than the drum 34, to cause movement of the frame 21 along the guides 31, 31 at a higher rate of speed than the drum 34. Said drums are driven from a worm gear 37, mounted on the shaft 36 and driven from a worm 39 on the shaft for the motor 33.

A flexible cable 40 is adapted to be secured at one of its ends to the forward end of the base frame 10 on an upright bracket 41, and is adapted to extend rearwardly along said frame and be wound around the drum 34, preferably with one turn. From thence said cable is adapted to extend rearwardly along the base frame to a hand lever 43, to which it is secured. Said hand lever is pivotally mounted on a rearward extension 44 of said base frame. Thus when the motor 33 is driving the drum 34, and pressure is exerted on the hand lever 43, to apply tension on the cable 40, the frame 21 will be moved forwardly along the base frame 10 at a low feeding speed, for feeding the cutter bar 14 longitudinally into the coal face.

A flexible cable 45 is secured at its forward end to the bracket 41, adjacent the lower end thereof, and extends rearwardly therefrom and is trained around the drum 35 in an opposite direction from which the cable 40 is trained around the drum 34. Said cable is secured at its rear end to a hand lever 46. Said hand lever is pivoted at its lower end to a rearward extension 47, projecting rearwardly from one of the sectors 27. Thus, when the drum 35 is driven from said motor and pressure is exerted on the hand lever 46, to maintain tension on its associated flexible cable, the frame 21 and drilling mechanism will be moved rearwardly along said base frame at a relatively high rate of speed, for withdrawing the drilling mechanism from the coal face.

Referring now in particular to the support for the drilling mechanism on the frame 21, the rotatable neck 18 is provided with a flanged portion 50, which is journaled in the frame 21 for rotation with respect thereto, and which is retained in position in said frame by means of an annular ring 51 abutting the forward end of said flanged portion and secured to the forward end of said frame by means of suitable cap screws. A worm gear 53 is keyed on said neck, adjacent the rear end thereof, and is driven from a worm 54 (see Figure 2). Said worm is mounted on a transversely extending shaft 55, journaled in said frame, and as herein shown is provided with a squared outer end adapted to be engaged by a hand crank 56, for rotating said worm and worm gear and for rotatably moving said neck, to position said drilling mechanism laterally with respect to said frame (see Figure 5).

The links 19, 19 of the parallel links 19 and 20, which adjustably mount the drilling mechanism on the neck 18, are pivotally mounted at their rear ends on bosses 60, 60, projecting laterally from opposite sides of said neck. Said links are pivotally mounted at their opposite ends on bosses 61, 61, projecting laterally from opposite sides of the housing and supporting framework 17 of the drilling mechanism 13 (see Figures 1 and 2).

The parallel links 20, 20, as herein shown, are pivotally mounted at their rear ends on bosses 64, 64, spaced ahead of the bosses 60, 60 and slightly below said bosses, and are pivotally mounted at their forward ends on bosses 65, 65, projecting laterally from opposite sides of a forward retaining and bearing portion 66 of the housing and supporting framework 17, which is secured thereto by means of suitable cap screws.

The means for moving said parallel links in parallel relation with respect to each other, to elevate or lower the drilling mechanism in a plurality of parallel planes, includes a worm gear sector 67, mounted adjacent one of its ends on a cross frame member 68, secured to the inner sides of the parallel links 19, 19 (see Figures 1 and 6). Said worm gear sector extends within a housing 69, projecting upwardly from the neck 18 and forming a housing and bearing support for a worm 70, meshing with said worm gear sector. Said worm is mounted on a longitudinally extending shaft 71, journaled in the housing and bearing support 70 and having a hand wheel 72 on its outer end, for rotating said worm and adjustably moving the drilling mechanism 13 and cutter bar 14 in a plurality of parallel planes towards and from the neck 18, in an obvious manner.

Referring now in particular to the details of the novel form of drilling mechanism of our invention, the rotatable head 15 is mounted in the support frame 17, for rotation with respect thereto, in a bearing 76, mounted in the forward bearing support portion 66 of the support frame 17. Said rotatable frame forms a support means for the cutter bar 14. Said cutter bar is of an ordinary construction, having a channeled guide extending around its periphery, which forms a guide for orbitally guiding the cutter chain 16 about said cutter bar. Said cutter chain is meshed with and driven from a cutter chain drive sprocket 80, mounted on a shaft 81, which is journaled at its ends in bearing support members 82, 82, mounted on opposite sides of the rotatable head 15 (see Figure 12).

The cutter chain 16, as herein shown, has cutter bits 83, 83 projecting outwardly therefrom and alternately arranged on opposite sides of the chain. Said bits may be of any desired form but, as herein shown, have substantially fishtail points, one of which points is longer than the other, and may be formed integral with or may be secured to opposite straps of the chain in a suitable manner, such as welding. It is of course obvious that said bits may be detachable in a well known manner, if desired.

The cutter bar 14 is mounted on the rotatable head 15 by means of a cutter bar support member 85. Said cutter bar support member is secured to the forward end of said rotatable head by means of cap screws 86, 86 and also forms a means for holding a cup-shaped shield 88 in position at the forward end of said support frame (see Figures 12 and 13). Said cup-shaped shield extends inwardly of said support frame and has the shaft 81 extending therethrough, and extends inwardly of said shaft around the inside of a bevel gear 89. Said bevel gear is secured to a forward end portion 90 of the support frame 17, which extends within a bearing 91 on the inside of the rear portion of the head 15, by means of nuts and bolts 92, 92. Said bevel gear 89 meshes with a bevel pinion 93, secured to the shaft 81, for driving said shaft upon rotation of said support frame with respect to said bevel gear 89, and said shield forms a means to prevent the cuttings from fouling said bevel gear and pinion.

The cutter bar support frame 85 is provided with a pair of parallel spaced forwardly extending support members 94, 94, adapted to extend along opposite sides of the cutter bar 14. Longitudinally spaced bolts 95, 95 extend through said support members and through longitudinally slotted portions 96, 96 of said cutter bar, and have bolts threaded on the ends thereof, to hold said cutter bar in position between said support portions. Said slotted portions may thus permit longitudinal adjustment of said cutter bar with respect to said support member, to permit the tension of the cutter chain to be adjusted. An adjusting screw 97, adapted to engage the inner end of said cutter bar, is provided for adjustably moving said cutter bar in an outward direction with respect to said support member (see Figure 7).

The cutter bar support member 85 is provided with openings 100, 100, to permit the cutter chain to pass therethrough and around the cutter chain drive sprocket 80, and is also provided with other openings 101, 101, to permit discharge of the cuttings from the shield 88 (see Figures 12, 13 and 15).

The means for rotatably driving the rotatable head and cutter bar and for driving the cutter chain about the cutter bar, upon rotation of said support, includes a motor 103, secured to the rear end of the support frame 17 and projecting rearwardly therefrom. Said motor is provided with a longitudinally extending motor shaft 104 having an armature pinion 105 on the forward end thereof. Said pinion meshes with and drives a spur gear 106 on a longitudinal shaft 107, journaled in said support frame. A pinion 109, on said last mentioned shaft, meshes with and drives a spur gear 110, secured to said rotatable head, adjacent the rear end thereof, for rotatably driving said head and for causing the cutter chain 16 to be driven about the cutter bar 14, by reason of the fact that the bevel pinion 93 meshes with the stationary bevel gear 89 and rolls around said bevel gear upon rotatable movement of said cutter bar.

It may be seen from the foregoing that when power is applied to the motor 103, the cutter bar 14 will be rotatably driven about the pivotal axis of the rotatable head 15, and that the cutter chain 16 will be driven about the outer periphery of said cutter bar. Thus, the bits 83 of said cutter chain will cut into the coal face as they travel around the forward end of said cutter bar and as said cutter bar is fed into the coal face in an endwise direction.

It may further be seen that a number of rapidly moving cutting surfaces successively pass around the forward end of the cutter bar and make a cut in the mine face as they pass therearound, for cutting a circular hole in a mine face as the bar is rotatably moving with respect thereto, and that each cutting surface after making its cut and traveling to its next cutting position, is given the opportunity to cool before making its next successive cut.

It should here be noted that while the rotatable cutter bar 14 and chain 16 are herein shown as being used for drilling only, said bar may be mounted on an ordinary form of transverse or shearing type of cutting machine and may cut a kerf in a coal face while being fed transversely across or vertically with respect to the mine face, as it is being rotatably driven.

Means are provided to aid the cutter chain in clearing cuttings from the hole, as it is fed therein, which as herein shown comprises a plurality of fins 111, 111, secured to opposite sides of the cutter bar 14. The fins 111 on one side of said cutter bar are parallel spaced and extend angularly in one direction, while said fins on the opposite side of said cutter bar are likewise parallel spaced and extend angularly in an opposite direction, to form in effect a spiral, to tend to propel the cuttings towards the rear end of the hole and to aid the cutter chain in clearing the hole during the cutting or drilling operation.

While we have herein shown and described one form in which our invention may be embodied, it will be understood that the construction thereof and the arrangement of the various parts may be altered without departing from the spirit and scope thereof. Furthermore, we do not wish to be construed as limiting our invention to the specific embodiment illustrated, excepting as it may be limited in the appended claims.

We claim as our invention:

1. In a drilling apparatus, a bar, a chain guided for orbital movement about said bar and having cutter bits projecting therefrom, power operated means for rotating said bar about a longitudinal axis and driving said chain orbitally about said bar during the drilling operation, and other power operated means for feeding said bar in an endwise direction during rotation of said bar and movement of said cutter chain about said bar.

2. In a cutting device adapted for use in mines, a rotatable support, a longitudinally extending bar projecting from said support and having a cutter chain guided for orbital movement thereabout, a sprocket for driving said cutter chain about said cutter bar, and power operated means for rotating said support and bar about a longitudinal axis intersecting said sprocket, and for driving said cutter chain about said cutter bar, for causing said bar to cut a round hole in a mine face.

3. In a cutting device adapted for use in mines, a rotatable head, a longitudinally extending cutter bar projecting from said head and having a cutter chain guided for orbital movement thereabout, power operated means for rotatably driving said head and bar about a longitudinal axis and for driving said cutter chain about said cutter bar, for causing said cutter chain to cut a round hole in a mine face, and other power operated means for feeding said cutter bar into a mine face in the direction of the axis of rotation thereof, as it is being rotatably driven about said longitudinal axis.

4. In a cutting device adapted for use in mines, a rotatable head, a longitudinally extending cutter bar projecting therefrom, a cutter chain guided for orbital movement about said cutter bar, a sprocket for driving said cutter chain about said cutter bar, a motor, a geared drive connection between said motor and said rotatable head, for rotating said head and cutter bar about a longitudinal axis intersecting said sprocket, and means driven by said motor for driving said cutter chain about said cutter bar at the same time said bar is being fed in a longitudinal endwise direction and being rotated about said longitudinal axis, to cause said cutter chain to cut a round hole of a diameter equal to the width of the path traversed by the outside of said cutter chain.

5. In a cutting device adapted for use in mines, a rotatable head, a longitudinally extending cutter bar projecting therefrom, a cutter chain guided for orbital movement about said cutter bar, a motor, a geared drive connection between said motor and said rotatable head, for rotating said head and cutter bar, and means actuated by rotation of said head and cutter bar, for driving said cutter chain about said cutter bar.

6. In a drilling apparatus adapted for use in mines, a base, a frame mounted on said base, a support frame mounted on said frame for vertical and lateral adjustment with respect thereto, a motor mounted on one end of said support frame, a head rotatably mounted on said support frame and projecting therefrom in a direction opposite from said motor, a drive connection from said motor to said head, for rotating said head, and a longitudinally extending cutter bar secured to and projecting from said head and rotatably driven thereby, said cutter bar having a cutter chain orbitally driven thereabout and adapted to be fed endwise into a mine wall, for drilling a round hole in a mine wall, upon rotation of said bar.

7. In an apparatus adapted for drilling in mines, a portable base, a frame guided for movement along said base, a motor on said frame, means driven by said motor for moving said frame along said base, a support frame mounted on said frame for vertical and lateral adjustable movement with respect thereto, a motor mounted on said support frame, adjacent one end thereof, a rotatable head mounted on said support frame for rotatable movement with respect thereto, a longitudinally extending cutter bar secured to and projecting from said rotatable head and rotatably driven thereby, a cutter chain guided for orbital movement about said cutter bar, and means for rotatably driving said rotatable head and cutter bar and for driving said cutter chain about said cutter bar, for causing said cutter chain to cut a round hole in a mine face as said cutter chain rounds the forward end of said cutter bar and as said bar is moved longitudinally with respect to said base frame.

8. In a cutting device, a support frame, a rotatable head journaled thereon, a cutter bar projecting from said rotatable head and having a cutter chain guided for orbital movement thereabout, a motor mounted on said support frame, a drive connection from said motor to said rotatable head, for rotating said head and cutter bar about a longitudinal axis, and means for driving said cutter chain orbitally about said cutter bar including a sprocket rotatably mounted on said rotatable head and meshing with said cutter chain, a stationary gear secured to said support frame, and another gear meshing with said gear and having drive connection with said sprocket for rotatably driving said sprocket upon rotation of said head.

9. In a cutting device, a support frame, a rotatable head journaled thereon, a cutter bar projecting from said rotatable head and having a cutter chain guided for orbital movement thereabout, a motor mounted on said support frame, a drive connection from said motor to said rotatable head, for rotating said head and cutter bar about a longitudinal axis, and means actuated by rotation of said head and cutter bar for driving said cutter chain about said cutter bar including a sprocket rotatably mounted within said head and having driving engagement with said cutter chain, a stationary gear secured to said support frame, and another gear mounted within said head and meshing with said first mentioned gear for driving said sprocket and said cutter chain about said cutter-bar upon rotatable movement of said head and cutter bar.

10. In a cutting device, a support frame, a rotatable head journaled thereon, a cutter bar projecting from said rotatable head and having a cutter chain guided for orbital movement thereabout, a motor mounted on said support frame, a drive connection from said motor to said rotatable head, for rotating said head and cutter bar about an axis extending longitudinally of said cutter bar, and means actuated by rotation of said head and cutter bar, for driving said cutter chain about said cutter bar including a sprocket rotatably mounted within said head and having driving engagement with said cutter chain, a bevel gear secured to said support frame, a bevel pinion mounted within said head and meshing with said bevel gear for driving said sprocket and said cutter chain about said bar upon rotation of said head and cutter bar with respect to said first mentioned bevel gear.

11. In a cutting device, a support frame, a rotatable head journaled thereon, a cutter bar projecting from said rotatable head and having a cutter chain guided for orbital movement thereabout, a motor mounted on said support frame, a drive connection from said motor to said rotatable head, for rotating said head and cutter bar about an axis extending longitudinally of said cutter bar, and means actuated by rotation of said head and cutter bar for driving said cutter chain about said cutter bar including a shaft journaled within said head, a sprocket mounted on said shaft and meshing with said cutter chain, a bevel pinion on said shaft for driving said sprocket, and a stationary bevel gear meshed with said pinion and secured to said support frame.

12. In a portable drilling apparatus, a base frame, a support frame mounted on said base frame and guided for slidable movement therealong, and drilling mechanism mounted on said support frame for vertical and lateral adjustment with respect thereto, an axle mounted intermediate the ends of said support frame and having a pair of wheels thereon forming a wheeled mounting for said base frame, a shoe pivotally mounted at the rear central portion of said base frame and adapted to engage the ground, and a jack adapted to be interposed between said shoe and the mine roof for holding said base frame from movement during the drilling operation and in various planes of adjustment with respect to the ground.

13. In a portable drilling apparatus, a base frame, a support frame mounted on said base frame and guided for slidable movement therealong, and drilling mechanism mounted on said support frame for vertical and lateral adjustment with respect thereto, an axle mounted intermediate the ends of said base frame and having a pair of wheels thereon, forming a wheeled mounting for said base frame, a shoe adapted to engage the ground and have connection with said base frame adjacent the rear end thereof, and a jack adapted to be interposed between said shoe and the mine roof for holding said base frame from movement during the drilling operation, the connection between said shoe and base frame including a leg pivotally connected between said shoe and base frame at its ends and means for holding said base frame from movement with respect to said leg, whereby said leg and shoe may form a means for holding said base frame in various angular positions of adjustment with respect to the ground, for adjusting the angle of said drill with respect to the coal face.

14. In a drilling apparatus and in combination with a rotatable drill, portable supporting and feeding means therefor including a portable base, a support frame guided for longitudinal movement therealong, a motor for moving said support frame along said base at a slow feeding speed, a wheeled support for said base including an axle disposed intermediate the ends thereof having a pair of wheels thereon, a handle projecting rearwardly from said base adapted to be gripped by the hands for moving said base from one working place to another, and means for holding said base in position during the drilling operation including a shoe, a jack for holding said shoe in engagement with the ground, and means connecting said shoe with said base, adjacent the rear end thereof.

15. In a drilling apparatus and in combination with a rotatable drill, portable supporting and feeding means therefor including a portable base, a support frame guided for longitudinal movement therealong, a motor for moving said support frame along said base at a slow feeding speed, a wheeled suport for said base including an axle disposed intermediate the ends thereof having a pair of wheels thereon, a handle projecting rearwardly from said base, adapted to be gripped by the hands, for moving said base from one working place to another, and means for holding said base in position during the drilling operation including a shoe, a jack for holding said shoe in engagement with the ground, and means connecting said shoe with said base, adjacent the rear end thereof including a leg pivotally connected between said base and shoe, and means for rigidly clamping said leg to said base for holding said base in various angular positions of adjustment with respect to the ground.

16. A drilling apparatus comprising a frame, an elongated cutter bar mounted in said frame for rotation about an axis extending longitudinally thereof, a cutter chain having bits therein, guided for movement about said bar, a sprocket for driving said cutter chain about said cutter bar and intersected by said axis of rotation of said cutter bar, and means for driving said cutter bar about said longitudinal axis while said cutter chain is moving thereabout and while being fed in the direction of said longitudinal axis, for causing said cutter chain to cut a round hole of a diameter equal to substantially the width of the outside of the orbit traversed by the bits of said cutter chain.

17. A drilling apparatus comprising an elongated bar mounted for rotation about a longitudinal axis, a cutter bit carrying cutter chain guided for orbital movement about said bar, a sprocket disposed rearwardly of said bar, for driving said cutter chain about said bar, said sprocket being intersected by the axis of rotation of said bar, and said bar being adapted to be driven about said longitudinal axis while said cutter chain is driven thereabout and at the same time being adapted to be fed in the direction of said longitudinal axis, to cause said cutter chain to cut a round hole of a diameter equal to substantially the width of the path traversed by the tips of the cutter bits of said cutter chain.

18. A drilling apparatus comprising an elongated bar, a single power driven cutter chain guided for orbital movement about said bar in the plane of said longitudinal axis, means for rotatably driving said bar about said longitudinal axis, and means disposed rearwardly of said bar and driven by the means for rotatably driving said bar about said longitudinal axis, for driving said cutter chain about said cutter bar.

CLEM C. AUSTIN.
CHARLES E. STOLTZ.